United States Patent Office 3,423,175
Patented Jan. 21, 1969

---

3,423,175
MANUFACTURE OF INTERHALOGEN COMPOUNDS AND HALOGENOIDS
David Horvitz, Robert J. Shaw, and William D. Baugh, Cincinnati, Ohio, assignors to National Distillers and Chemical Corporation, New York, N.Y., a corporation of Virginia
No Drawing. Filed June 13, 1966, Ser. No. 556,917
U.S. Cl. 23—205    13 Claims
Int. Cl. C01b 9/00

ABSTRACT OF THE DISCLOSURE

An oxidative catalytic process for the preparation of interhalogen compounds and halogenoid compounds is provided, useful in the preparation of iodine chloride, bromine chloride, cyanogen iodide, and cyanogen bromide from the halogens or their halides, employing molecular oxygen and a nitrogen oxide as a catalyst.

---

This invention relates to an oxidative catalytic process for the preparation of certain interhalogen compounds and halogenoid compounds and more particularly to a process for preparing iodine chloride, bromine chloride, cyanogen iodide and cyanogen bromide from the halogens or their halides, employing molecular oxygen and a nitrogen oxide as a catalyst.

The interhalogen compounds, iodine chloride and bromine chloride, have heretofore been manufactured by direct interaction of the halogens in their elementary state, as (1) $\qquad I_2 + Cl_2 \rightarrow 2ICl$ or by the interaction of an iodide or bromide (or the corresponding elementary halogen) with hydrochloric acid in the presence of oxidizing agents other than oxygen, as (2) $\quad 2HI + KIO_3 + 4HCl \rightarrow 3ICl + KCl + 3H_2O$
or $\quad 2KI + KIO_3 + 6HCl \rightarrow 3ICl + 3KCl + 3H_2O$
(3) $\quad 2I_2 + KIO_3 + 6HCl \rightarrow 5ICl + KCl + 3H_2O$ The halogenoid, cyanogen iodide, has heretofore been prepared by the reaction of elementary iodine with a cyanide salt, as (4) $\qquad I_2 + NaCN \rightarrow ICN + NaI$ If hydrogen cyanide was used, or the reaction medium was acidic, oxidizing agents were required to effect the reaction. Oxygen was not effective.

(5) $\quad 2I_2 + KIO_3 + HCl + 5HCN \rightarrow 5ICN + KCl + 3H_2O$
or $\quad 2I_2 + KIO_3 + 6HCl + 5KCN \rightarrow 5ICN + 6KCl + 3H_2O$ When iodine is treated with an aqueous solution of hydrogen cyanide or with an ionizable cyanide salt in an acidic medium, in the absence of an oxidizing agent, there is only a slight degree of reaction to form ICN. In fact, when hydriodic acid, HI, is added to a solution of cyanogen iodide, the latter is decomposed immediately and essentially quantitatively to iodine and hydrogen cyanide, according to the reaction (6) $\qquad HI + ICN \rightarrow I_2 + HCN$ It is an object of this invention to provide a new and improved process for the manufacture of the interhalogen compounds, iodine chloride and bromine chloride, and the halogenoids, cyanogen iodide and cyanogen bromide. A further object of this invention is to produce these compounds in high yield and purity by a process which utilizes molecular oxygen as the oxidizing agent. Another object is to produce these compounds by a process which is more economically feasible than those hitherto employed.

In accordance with the invention, a process is provided for the preparation of certain halogenoid and interhalogen compounds, iodine chloride, bromine chloride, cyanogen iodide and cyanogen bromide, which comprises oxidatively reacting an iodide or a bromide or the corresponding free halogen with hydrogen chloride or an ionizable chloride salt or hydrogen cyanide or an ionizable cyanide salt in the presence of at least an equivalent amount of strong acid for each ionizable salt, water, molecular oxygen, and a nitrogen oxide catalyst selected from the group consisting of nitric oxide, nitrogen dioxide and nitrous acid.

The cyanide can be present in the form of hydrogen cyanide, or an ionizable cyanide salt in the presence of a strong acid in at least an equivalent amount.

The chloride can be present as hydrochloric acid or as an ionizable chloride salt in the presence of a strong acid in an at least equivalent amount.

The iodine or bromine can be present in the form of free iodine or bromine, hydriodic acid or hydrobromic acid, or an ionizable iodide or bromide salt in the presence of a strong acid in an at least equivalent amount.

Thus, the following reactions can be set out for the process of the invention for the formation of iodine chloride and bromine chloride.

(7) $\quad 2I_2 + 4H^+ + 4Cl^- + O_2 \rightarrow 4ICl + 2H_2O$
(8) $\quad 2I^- + 4H^+ + 2Cl^- + O_2 \rightarrow 2ICl + 2H_2O$
(9) $\quad 2Br_2 + 4H^+ + 4Cl^- + O_2 \rightarrow 4BrCl + 2H_2O$
(10) $\quad 2Br^- + 4H^+ + 2Cl^- + O_2 \rightarrow 2BrCl + 2H_2O$ The following reactions can be set out for the formation of cyanogen iodide and cyanogen bromide by the process of the invention:

(11) $\quad 2I_2 + 4HCN + O_2 \rightarrow 4ICN + 2H_2O$
(12) $\quad 2I^- + 2HCN + 2H^+ + O_2 \rightarrow 2ICN + 2H_2O$
(13) $\quad 2I_2 + 4H^+ + 4CN^- + O_2 \rightarrow 4ICN + 2H_2O$
(14) $\quad 2I^- + 4H^+ + 2CN^- + O_2 \rightarrow 2ICN + 2H_2O$
(15) $\quad 2Br_2 + 4HCN + O_2 \rightarrow 4BrCN + 2H_2O$
(16) $\quad 2Br^- + 2HCN + 2H^+ + O_2 \rightarrow 2BrCN + 2H_2O$
(17) $\quad 2Br_2 + 4H^+ + 4CN^- + O_2 \rightarrow 4BrCN + 2H_2O$
(18) $\quad 2Br^- + 4H^+ + 2CN^- + O_2 \rightarrow 2BrCN + 2H_2O$ Equations 7 and 8 show that an aqueous solution of hydrochloric acid, or an ionizable chloride salt solution containing at least an equivalent amount of a strong acid, reacts with iodine, or hydriodic acid, or an ionizable iodide salt solution containing at least an equivalent amount of an acid and with molecular oxygen to produce iodine chloride. Equations 9 and 10 show that bromine chloride is produced if bromine, hydrobromic acid or an ionizable bromide salt is used instead of the iodine, hydriodic acid or iodide salt. Equations 11, 12, 13 and 14 show that hydrogen cyanide or an ionizable cyanide salt solution containing at least an equivalent amount of strong acid reacts with iodine, hydriodic acid or an ionizable iodide salt solution containing at least an equivalent amount of an acid and with molecular oxygen to produce cyanogen iodide. Equations 15 to 18 show how cyanogen bromide can be manufactured by the process of this invention. The use of hydrogen cyanide to produce cyanogen halides is much more economical than the use of cyanide salts, particularly when oxygen is used as the oxidizer.

In all previous work the corresponding oxidations have required stoichiometric amounts of oxidizing agents such as permanganate, bromate, iodate, periodate, nitric acid, etc. Now it has been found possible to utilize molecular oxygen, or gas mixtures containing oxygen (air, for example), to effect the reactions when a suitable catalyst is added. The catalysts which can be used in this process are nitric oxide, nitrogen dioxide or nitrous acid or a substance from which any of these compounds may be produced under the conditions of the reaction, including inorganic and organic nitrites and nitrates, nitric acid and nitrosyl halides.

Precursor compounds which form one of the above nitrogen oxides under the conditions of the reaction include nitrosyl chloride, nitrosyl bromide, and nitrosyl iodide; the alkali metal nitrites and nitrates, such as sodium nitrite, sodium nitrate, potassium nitrite, and potassium nitrate, the alkaline earth metal nitrites and nitrates, such as calcium nitrate, strontium nitrate, barium nitrate, aluminum nitrate, and manganese nitrate.

The concentration of the catalyst that can be used in the reaction solution is usually within the range from about 0.001 to about 0.1 molar, and preferably in an amount within the range from about 0.003 to about 0.03 molar. Actually, there is no upper limit on the amount of catalyst, but in amounts in excess of 0.1 molar, a noticeably greater catalytic effect is not normally observed.

When nitric acid or nitrates are used as the catalyst, an induction period may be observed before the reaction begins. No induction period is noted when using nitrogen oxides containing nitrogen in a lower valence state.

Molecular oxygen is employed as the oxidizing agent. Gas mixtures containing oxygen (air, for example) may be employed. The reaction will proceed under an oxygen or air atmosphere, but if desired, the contact between the reaction mixture and oxygen can be improved by bubbling the gas through the reaction mixture, together with agitation.

The reaction appears to proceed by way of an ionic mechanism. Consequently, the reaction medium must contain at least a small proportion of water, usually in excess of about 0.5% by weight. Water is an excellent medium for the reaction, and is usually used if the reactants are sufficiently water-soluble. Additional solvents can be employed if desired, including not only water-miscible solvents, but also water-immiscible solvents. When a water-immiscible solvent is employed, the reaction mixture should be agitated sufficiently to maintain the water homogeneously distributed in the solvent. Exemplary water-miscible solvents include methanol, ethanol, propanol, isopropanol, acetic acid, dioxane, acetone, acetonitrile, and other organic solvents which are inert to the reactants under the reaction conditions. Water-immiscible solvents include benzene, carbon tetrachloride, nitrobenzene, chlorobenzene, 1,2-dichloroethane, perchloroethylene, hexane, diethyl ether, and other water-immiscible solvents which are inert under the reaction conditions.

When a hydrogen halide is used, such as hydrogen chloride, hydrogen bromide, and hydrogen iodide, no additional acid is necessary. If a halide salt is employed, then as indicated hereinbefore, a strong acid is used in an amount equivalent to the halide to be reacted. Strong inorganic mineral acids can be used, such as hydrochloric acid, hydrobromic acid, sulfuric acid and phosphoric acid, and strong organic acids also are useful, such as trifluoroacetic acid and trichloroacetic acid.

The temperature at which the reaction can be carried out can be within the range from about 0 to about 100° C., and preferably should be within the range from about 20 to about 60° C. Temperatures higher than 100° C. can be employed, but they offer no advantages.

A partial pressure of oxygen over the reaction mixture of as little as 0.1 atmosphere is sufficient to enable the reaction to proceed. This is less oxygen than is present in atmospheric air at atmospheric pressure. Elevated pressures of oxygen can be used, and oxygen pressures as high as 100 atmospheres or greater also given satisfactory results. However, excessive pressures are usually not advantageous. A preferred range of oxygen pressure is from about 0.2 to about 10 atmospheres.

In the production of iodine chloride or bromine chloride, using chloride ion in the form of hydrogen halide or a halide salt, best results are obtained if the concentration of chloride ion in the reaction medium is at least 3 normal, and not in excess of about 8.5 normal. If a chloride salt is used, there must as stated above be hydrogen ions present in an amount equivalent to the chloride ions. The concentration of iodine or iodide or bromine or bromide in such processes is not critical, but the amount that is used will be at least stoichiometrically equivalent to the iodine chloride or bromine chloride that is to be produced.

The iodine chloride formed by this process is held in aqueous solution as a hydrochloric acid complex, probably of the form $HCl \cdot ICl$, and as such cannot be readily isolated from solution, as for example, by distillation or solvent extraction. However, it may be used as its aqueous solution in most reactions. On the other hand, bromine chloride and cyanogen iodide and cyanogen bromide can be readily isolated and purified by solvent extraction or distillation, if desired.

Thus, the process of the invention is applicable to the formation of interhalogen compounds and cyanogen halides starting with hydrogen chloride, hydrogen bromide, hydrogen iodide, sodium iodide, sodium chloride, sodium bromide, potassium chloride, potassium bromide, potassium iodide, calcium iodide, calcium bromide, and calcium chloride, and barium chloride, barium bromide, aluminum chloride, magnesium chloride, magnesium bromide, cuprous chloride, cupric chloride, iron chloride, iron bromide, sodium cyanide, potassium cyanide, lithium cyanide, calcium cyanide, strontium cyanide, barium cyanide, and like salts. These can be used in admixture.

The following examples in the opinion of the inventors represent the best embodiments of their invention.

Example 1

A round-bottom flask equipped with a stirrer, gas-inlet tube and dropping funnel was employed as the reaction vessel for preparing iodine chloride. The gas-inlet tube was fed from a burette containing oxygen over mercury and fitted with a leveling bulb. The flask was purged with oxygen, and there then were introduced 12.7 g. of (0.10 equivalent) iodine, 35 ml. of 12 N hydrochloric acid, 25 ml. of water and 0.1 g. sodium nitrite. Stirring was begun, and rapid absorption of oxygen began at once. In about two hours, oxygen absorption ceased, and all of the iodine has disappeared, leaving a clear yellow-orange solution which was found to be iodine chloride held in aqueous solution as a hydrochloric acid complex. A total of about 25 millimoles of oxygen was absorbed, the theoretical amount required for the formation of iodine chloride, according to the equation:

$$I_2 + 2HCl + 0.5\ O_2 \rightarrow 2ICl + H_2O$$

The reaction solution was used directly as the source of iodine chloride in the halogenation of ethylene.

Ethylene gas was introduced into the flask containing the iodine chloride via the oxygen inlet, and 100 milimoles of ethylene were quickly absorbed, while a heavy layer, immiscible in the aqueous solution, was formed, which was separated from the aqueous solution. The product, by boiling point and gas phase chromatography, was found to be 1-iodo-2-chloroethane, which is the product to be expected from the addition of iodine chloride to ethylene. From the amount of oxygen initially absorbed and the amount of ethylene adduct formed, it is evident that the yield of iodine chloride, based on iodine, was essentially quantitative.

Example 2

An apparatus similar to that of Example 1 was purged with molecular oxygen. 10 ml. of 12 N hydrochloric acid, 10 ml. water, 10 g. of iodine (78.7 milliequivalents) and 0.1 g. of sodium nitrite were introduced into the reaction vessel. The resulting reaction mixture was about 6 N hydrochloric acid. The reaction mixture was continuously stirred until the formation of iodine chloride and water ceased, at which time the solution was about 3 N and a total of 13.6 millimoles of oxygen had been absorbed, equivalent to the formation of 54.4 millimoles of iodine chloride and the consumption of an equivalent amount of hydrochloric acid.

Thereafter, 3 ml. of 12 N hydrochloric acid was added to the final reaction mixture of Example 2, thereby bringing the normality up to about 4 N. Oxygen absorption began again, until a total, including the previous quantity absorbed, of 19.6 millimoles had been consumed with the formation of iodine chloride. This amount of oxygen is the theoretical required for complete reaction. A minimum of 3 N is required for this reaction to proceed.

A second run was made using 10 ml. of 12 N hydrochloric acid, 2.548 g. of iodine (20 milliequivalents) and 0.1 g. of sodium nitrite. The solution was stirred under oxygen, but only a small amount of oxygen was absorbed. Small additions of water were made from time to time, but no oxygen absorption occurred until the solution had been diluted to about 8.5 N hydrochloric acid, at which time the theoretical amount of oxygen was absorbed.

Accordingly, it is seen that this reaction requires an acidity no greater than 8.5 N, in order to proceed.

Example 3

In this example, the formation of iodine chloride was carried out at a temperature of about 0° C.

In an apparatus similar to that used in Example 1, there were introduced 7 ml. of 12 N hydrochloric acid, 5 ml. of water, 1.276 g. (10 milliequivalents) of iodine and 0.1 g. of sodium nitrite, all cooled to 0° C. in an ice-bath. The solution was about 7.0 N with respect to HCl. The reaction mixture was stirred under oxygen, while the temperature was maintained at 0° C. The theoretical amount of oxygen (2.5 millimoles) was absorbed into the reaction mixture in 90 minutes, and iodine chloride was thereby formed.

Examples 4 to 8

A series of runs was carried out employing various organic solvents. Each reaction mixture contained 7 ml. of 12 N hydrochloric acid, 5 ml. of water, 2.54 g. of iodine and 0.1 g. of sodium nitrite, and thus was about 7.0 N with respect to HCl. The solvents were as indicated below:

Example No.: Solvent
4 _____ Cyclohexane.
5 _____ 1,2-dichloroethane.
6 _____ Nitrobenzene.
7 _____ Benzene.
8 _____ Chloroform.

Each solution was stirred under oxygen, as in Example 1, and in each case the theoretical amount of oxygen was absorbed, as the iodine disappeared from its solution in the organic layer. In each reaction mixture it was found that substantially all of the iodine chloride was dissolved in the aqueous layer, and that substantially none was contained in the organic layer.

Example 9

In an apparatus similar to that of Example 1 were placed 3.32 g. of potassium iodide (0.020 mole), 50 ml. of 6 N hydrochloric acid and 0.1 g. of sodium nitrite. The solution was stirred under oxygen at ambient temperature. A total of 258 cc. of oxygen was absorbed in the reaction mixture, and iodine chloride was formed in a yield, based on iodide, which was essentially quantitative.

Example 10

In an apparatus similar to that of Example 1, there were introduced 2 ml. of 49% hydrobromic acid (18 millimoles), 10 ml. of 6 N hydrochloric acid and 0.1 g. of sodium nitrite. The solution was stirred under oxygen until about 7.3 millimoles of oxygen had been absorbed. At this point, 3 ml. of 12 N hydrochloric acid was added, and more oxygen was absorbed. The reaction was discontinued when 8.4 millimoles of oxygen had been consumed, although it was still being absorbed at a slow rate.

Benzene was added to the aqueous solution, and the reaction product was extracted from the aqueous solution.

The product was shown to be bromine chloride by the red color of the benzene solution, by titration with thiosulfate, and by the fact that if only bromine was formed and not bromine chloride, the maximum amount of oxygen absorbed would have been about 4.5 millimoles.

The theoretical amount of oxygen required to form bromine chloride was 9 millimoles.

Example 11

A round-bottom flask equipped with a stirrer, gas-inlet tube and dropping funnel was employed as the reaction vessel for preparing cyanogen iodide. The gas-inlet tube was fed from a burette containing oxygen over mercury and fitted with a leveling bulb. The flask was purged with oxygen, and there then were introduced 20 cc. of water, 80 cc. of N,N-dimethyl formamide, 5.4 grams (0.11 mole) of sodium cyanide, 12 cc. of 12 N hydrochloric acid (0.144 mole), 2.5 grams of iodine (0.0197 equivalent) and 0.1 gram of sodium nitrite. Stirring was begun, and rapid absorption of oxygen began at once. The solution was maintained at 0° C. during the reaction.

After 95 minutes, 5 millimoles of oxygen were absorbed in the solution. The solution changed from the deep color of iodine to colorless, and was found to contain cyanogen iodide. The amount of oxygen absorbed corresponded to that required to produce cyanogen iodide. In spite of the large excess of cyanide, there appeared to be no tendency to produce cyanogen.

Example 12

In an apparatus similar to that used in Example 1, there were introduced 10 ml. of water, 55 ml. of acetonitrile, 2 grams of sodium cyanide (0.041 mole), 4 ml. of concentrated hydrochloric acid (0.060 mole), 2.54 grams of iodine (0.020 equivalent), and 0.1 gram of sodium nitrite. The solution was stirred under oxygen at 0° C. About 5 millimoles of oxygen were absorbed, and thereafter the solution changed from a deep color of iodine to colorless. The solution was found to contain cyanogen iodide.

Example 13

In an apparatus similar to that of Example 1, there were introduced 25 ml. of water, 2.54 grams of iodine (0.020 equivalent), 1.0 gram of sodium cyanide (0.020 mole), 3.0 ml. of 6 N hydrochloric acid (0.021 mole) and 0.1 gram of sodium nitrite. The solution was stirred under oxygen at ambient temperature and about 5 millimoles of oxygen were absorbed into the solution. The solution became colorless and needle-like crystals of cyanogen iodide were observed.

The needle-like crystals were extracted from the solution with methylene chloride. The solution was dried with sodium sulfate, and then evaporated to dryness to get 2.79 grams of solids, which was analyzed by sodium thiosulfate and found to be 94.5% pure cyanogen iodide.

Example 14

In an apparatus similar to that used in Example 1, there were introduced 10 ml. of 49% hydrobromic acid, 10 ml. of water, 2.0 grams (0.04 mole) of sodium cyanide and 0.1 gram of sodium nitrite. The solution was stirred under oxygen at ambient temperature for about 2½ hours, during which time it had absorbed about 20 millimoles of oxygen (theoretical based on the cyanide present). Some crystals of cyanogen bromide could be observed at the surface of the liquid. The solution was extracted with chloroform and an aliquot of the chloroform solution was titrated with thiosulfate. The titer showed that the cyanogen bromide had been formed in essentially theoretical yield.

Example 15

In an apparatus similar to that used in Example 1, there were introduced 100 ml. 6 N hydrochloric acid, 2.54 grams of iodine, 0.6 ml. 70% nitric acid. This solution was stirred under oxygen at ambient temperature and atmospheric pressure. No absorption of oxygen was observed for 45 minutes. Then oxygen began to be absorbed at a rapid rate until 123 cc. had been absorbed, the theoretical amount of oxygen required to produce iodine chloride.

Having regard to the foregoing disclosure, the following is claimed as the inventive and patentable embodiments thereof:

1. A process for the preparation of iodine chloride, bromine chloride, cyanogen iodide, and cyanogen bromide, which comprises oxidatively reacting at a temperature within the range from about 0 to about 100° C. a member selected from the group consisting of hydrogen chloride, an ionizable chloride salt, hydrogen cyanide and an ionizable cyanide salt with a member selected from the group consisting of iodine, bromine, an ionizable iodide salt, and an ionizable bromide salt, and with a stoichiometric amount of molecular oxygen, at least an equivalent amount of a strong acid being present for each ionizable salt used in the presence of water, and a concentration within the range from about 0.001 to about 0.1 molar of a nitrogen oxide catalyst selected from the group consisting of nitric oxide, nitrogen dioxide and nitrous acid, and recovering from the reaction mixture the desired iodine chloride, bromine chloride, cyanogen iodide, or cyanogen bromide.

2. A process in accordance with claim 1, wherein the reaction is carried out in aqueous solution.

3. A process in accordance with claim 1, wherein the catalyst is formed in situ from a precursor compound selected from the group consisting of inorganic and organic nitrites and nitrates, nitric acid and nitrosyl halides.

4. A process in accordance with claim 1, wherein a reactant is a chloride in a concentration within the range from about 3 to about 8.5 N in the reaction solution.

5. A process in accordance with claim 1, which comprises reacting iodine or an iodide with a chloride to form iodine chloride.

6. A process in accordance with claim 1, which comprises reacting bromine or a bromide with a chloride to form bromine chloride.

7. A process in accordance with claim 1, which comprises reacting iodine or an iodide with a cyanide to form cyanogen iodide.

8. A process in accordance with claim 1, which comprises reacting bromine or a bromide with a cyanide to form cyanogen bromide.

9. A process in accordance with claim 1, wherein the partial pressure of oxygen is within the range from 0.1 to 100 atmospheres.

10. A process in accordance with claim 9 wherein the oxygen is supplied as air.

11. A process in accordance with claim 1, wherein the nitrogen oxide catalyst is nitric acid.

12. A process in accordance with claim 1, wherein the nitrogen oxide catalyst is a nitrite.

13. A process in accordance with claim 1 in which the reaction is carried out in the presence of water and an organic solvent.

References Cited

UNITED STATES PATENTS

| | | | |
|---|---|---|---|
| 1,779,984 | 1/1927 | Schmittnagel | 23—359 |
| 3,199,951 | 8/1965 | Fierce et al. | 23—359 |
| 3,131,028 | 3/1964 | Stow | 23—215 |
| 3,179,498 | 4/1965 | Harding et al. | 23—215 |

FOREIGN PATENTS

| | | |
|---|---|---|
| 9,710 | 5/1900 | Great Britain. |
| 820,580 | 9/1959 | Great Britain. |

OTHER REFERENCES

Mellor, J. W.: A Comprehensive Treatise on Inorganic and Theoretical Chemistry, pp. 116–17 and 202–03, vol. 2; Longman's, Green and Co.; London, 1922.

EARL C. THOMAS, *Primary Examiner.*

G. O. PETERS, *Assistant Examiner.*

U.S. Cl. X.R.

23—215, 367